United States Patent
Boyd et al.

(10) Patent No.: US 8,200,914 B2
(45) Date of Patent: Jun. 12, 2012

(54) APPARATUS, SYSTEM, AND METHOD FOR A READ-BEFORE-WRITE STORAGE CONTROLLER INSTRUCTION

(75) Inventors: Kenneth W. Boyd, Tucson, AZ (US); Kenneth F. Day, III, Tucson, AZ (US); Amiram Hayardeny, Beijing (CN); Michael E. Factor, Haifa (IL); John J. Wolfgang, Midlothian, VA (US)

(73) Assignee: International Business Machines Corporation, Armonk, NY (US)

( * ) Notice: Subject to any disclaimer, the term of this patent is extended or adjusted under 35 U.S.C. 154(b) by 850 days.

(21) Appl. No.: 11/969,183

(22) Filed: Jan. 3, 2008

(65) Prior Publication Data

US 2009/0177850 A1    Jul. 9, 2009

(51) Int. Cl.
*G06F 12/00* (2006.01)
*G06F 13/00* (2006.01)
*G06F 13/28* (2006.01)

(52) U.S. Cl. ........................................ 711/154; 707/684

(58) Field of Classification Search .................. 711/154
See application file for complete search history.

(56) References Cited

U.S. PATENT DOCUMENTS

| | | | | |
|---|---|---|---|---|
| 5,864,849 A | * | 1/1999 | Bohannon et al. | 707/648 |
| 5,933,593 A | * | 8/1999 | Arun et al. | 714/6 |
| 6,023,710 A | | 2/2000 | Steiner et al. | 707/204 |
| 6,343,379 B1 | | 1/2002 | Ozawa et al. | 725/63 |
| 6,772,364 B1 | | 8/2004 | Pinter et al. | 714/5 |
| 2003/0217257 A1 | | 11/2003 | Ebsen et al. | 713/100 |
| 2004/0193998 A1 | | 9/2004 | Blackburn et al. | 714/763 |
| 2005/0283579 A1 | | 12/2005 | De Jong et al. | 711/154 |
| 2006/0230311 A1 | * | 10/2006 | Kao et al. | 714/16 |
| 2006/0259207 A1 | | 11/2006 | Natsume | 701/4 |
| 2007/0028056 A1 | * | 2/2007 | Harris | 711/150 |
| 2007/0168707 A1 | * | 7/2007 | Kern et al. | 714/6 |
| 2007/0260645 A1 | * | 11/2007 | Augenstein et al. | 707/202 |

* cited by examiner

*Primary Examiner* — Brian R. Peugh
*Assistant Examiner* — Prasith Thammavong
(74) *Attorney, Agent, or Firm* — Kunzler Needham Massey & Thorpe

(57) ABSTRACT

An apparatus, system, and method are disclosed for a read-before-write storage controller instruction. A sequencer receives an atomic read-before-write instruction comprising new data, a target address for the new data, and an undo log address. An I/O unit reads old data from the target address, writes the old data and the target address to the undo log address, and writes the new data to the target address as directed by the sequencer.

24 Claims, 9 Drawing Sheets

800a

| RBW Command 805 | New Data Address 810 | Target Address 815 | Undo Log Address 820 |

800b

| RBW Command 805 | New Data 825 | Target Address 815 | Flag 830 |

800c

| RBW Command 805 | New Data 825 | Target Address 815 | Undo Log Index 835 |

840

| Undo Command 845 | Rollback Time 850 |

860

| Redo Command 865 | Redo Time 870 |

APPARATUS, SYSTEM, AND METHOD FOR A READ-BEFORE-WRITE STORAGE CONTROLLER INSTRUCTION

BACKGROUND OF THE INVENTION

1. Field of the Invention

This invention relates to writing data and more particularly relates to a read-before-write storage controller instruction.

2. Description of the Related Art

Data storage systems, referred to hereinafter as storage systems, frequently write new data to an address of a storage device. Often the new data overwrites old data previously stored at the address.

Unfortunately, new data may erroneously overwrite valuable old data. To prevent the loss of valuable data, storage systems often employ an undo log. The undo log preserves overwritten data. Thus if an administrator or user determines that the old data has been erroneously overwritten, the old data can be recovered from the undo log.

The undo log is typically a memory device. In one embodiment, the undo log may be configured as addressable memory. Creating and maintaining the undo log typically requires reading the old data from the storage device address and writing the old data to the undo log. The new data may then be written to the storage device address. The process is often referred to as a read-before-write operation. Unfortunately, the read-before-write operation must be explicitly encoded at the application level. This is very costly from a time perspective as it requires the storage controller to interact with the application level three times for each data update to be saved in the undo log.

SUMMARY OF THE INVENTION

From the foregoing discussion, there is a need for an apparatus, system, and method for a read-before-write storage controller instruction. Beneficially, such an apparatus, system, and method would simplify the reliable implementation of an undo log.

The present invention has been developed in response to the present state of the art, and in particular, in response to the problems and needs in the art that have not yet been fully solved by currently available read-before-write methods. Accordingly, the present invention has been developed to provide an apparatus, system, and method for a read-before-write storage controller instruction that overcome many or all of the above-discussed shortcomings in the art.

The apparatus for a read-before-write instruction is provided with a plurality of elements configured to functionally execute the steps of receiving an atomic read-before-write instruction, reading old data, writing the old data to an undo log address, and writing the new data. These elements in the described embodiments include a sequence and an input/output (I/O) unit.

The sequencer receives the atomic read-before-write instruction comprising new data, a target address for the new data, and an undo log address. The I/O unit reads old data from the target address, writes the old data and the target address to the undo log address, and writes the new data to the target address as directed by the sequencer.

A system of the present invention is also presented for a read-before-write instruction. The system may be embodied in a storage system. In particular, the system, in one embodiment, includes a target volume, an undo log, a redo log, and a processor.

The target volume, undo log, and redo log each comprise addressable memory. The processor receives an atomic read-before-write instruction comprising new data, a target address on the target volume for the new data, and an undo log address in the undo log, reads old data from the target address, writes the old data and the target address to the undo log address, writes the new data to the target address, receives an undo instruction, reads the old data and target address from the undo log, and writes the old data at the target address.

A method of the present invention is also presented for a read-before-write instruction. The method in the disclosed embodiments substantially includes the steps to carry out the functions presented above with respect to the operation of the described apparatus and system. In one embodiment, the method includes receiving an atomic read-before-write instruction, reading old data, writing the old data to an undo log address, and writing the new data.

A sequencer receives an atomic read-before-write instruction comprising new data, a target address for the new data, and an undo log address. An I/O unit reads old data from the target address, writes the old data and the target address to the undo log address, and writes the new data to the target address as directed by the sequencer.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention executes an atomic read-before-write instruction. In addition, the present invention may simplify the implementation of an undo log. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Processor readable programs may be configured as software, firmware, and/or implemented as hardwired semiconductor logic. The processor readable programs may be a single instruction, or many instructions, and may even be distributed over several different code segments, among different programs, and across several memory devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
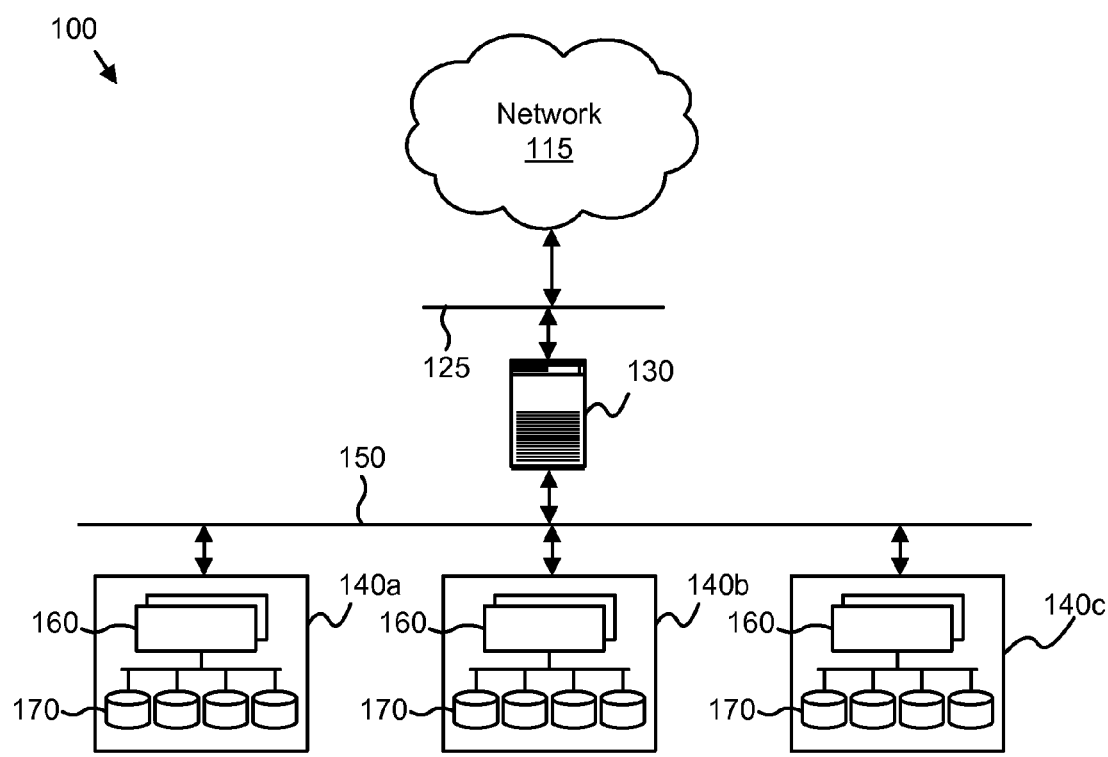
FIG. 1 is a schematic block diagram illustrating one embodiment of a storage system in accordance with the present invention.

FIG. 1 is a schematic block diagram illustrating one embodiment of a storage system 100 in accordance with the present invention. The system 100 includes a network 115, an internal network 125, a server 130, a storage communications channel 150, and one or more storage subsystems 140.

The network 115 may be the Internet, a wide area network, a local area network, and the like. The server 130 may be configured as mainframe computers, blade centers comprising multiple blade servers, and the like. Although for simplicity one network 115, one internal network 125, one server 130, one storage communications channel 150, and three storage subsystems 140 are shown, any number of clients, networks 115, routers 120, internal networks 125, servers 130, storage communications channels 150 and storage subsystems 140 may be employed. One of skill in the art will also readily recognize that the system 100 could include other data processing devices such as bridges, scanners, printers, and the like.

Each storage subsystem 140 includes one or more controllers 160 and one or more storage devices 170. The controllers 160 write data to and read data from the storage devices 170. The storage devices 170 may be hard disk drives, optical storage devices, magnetic tape drives, micromechanical storage devices, holographic storage devices, and semiconductor storage devices.

In one embodiment, the system 100 provides data storage and data manipulation services for the clients that communicate with the system 100 through the network 115. For example, a client may access data stored on a storage device 170 of a storage subsystem 140 by communicating a request through the network 115, the internal network 125, the server 130, and the storage communications channel 150 to a storage controller 160 for the storage device 170. The storage controller 160 may retrieve the data from the storage device 170 and communicate the data to the client.

Figure 2:
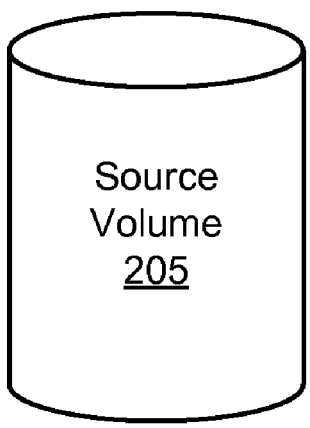
FIG. 2 is a schematic block diagram illustrating one embodiment of storage volumes of the present invention.
Figure 2:
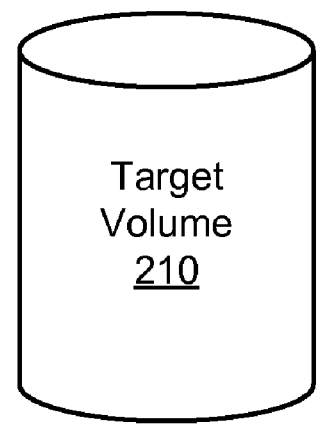
Figure 2:
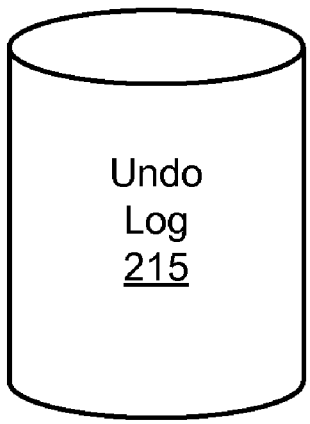
Figure 2:
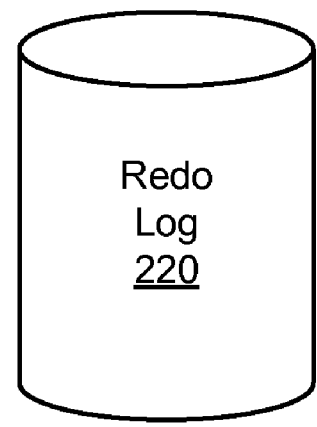

FIG. 2 is a schematic block diagram illustrating one embodiment of storage volumes 200 of the present invention. The description of the volumes 200 refers to elements of FIG. 1, like numbers referring to like elements. The storage volumes 200 include a source volume 205, a target volume 210, an undo log 215, and a redo log 220. The source volume 205, target volume 210, undo log 215, and redo log 220 may comprise addressable memory.

The source volume 205, target volume 210, undo log 215, and redo log 220 may be configured as storage devices 170. For example, the source volume 205 and target volume 210 may be hard disk drive storage devices 170. Alternatively, the source volume 205, target volume 210, undo log 215, and redo log 220 may be configured as logical volumes. For example, portions of a plurality of storage devices 170 may be organized as a logical volume comprising the target volume 210 as is well known to those of skill in the art. In one embodiment, the undo log 215 and the redo log 220 are addressable semiconductor memory in one or more controllers 160.

The system 100 may write data from the source volume 205 to the target volume 210. For example, a controller 160 of a first storage subsystem 140a may write the data from a storage device 170 of the first storage subsystem 140a to a storage device 170 of a second storage subsystem 140b as part of a migration operation.

The written new data may overwrite old data. As a result, the system 100 may store the old data in the undo log 215 so that the old data may be recovered if needed. If the write of new data is undone, the new data may be written to the redo log 220. The present invention provides a read-before-write instruction to implement the undo log 215 as will be described hereafter.

Figure 3:
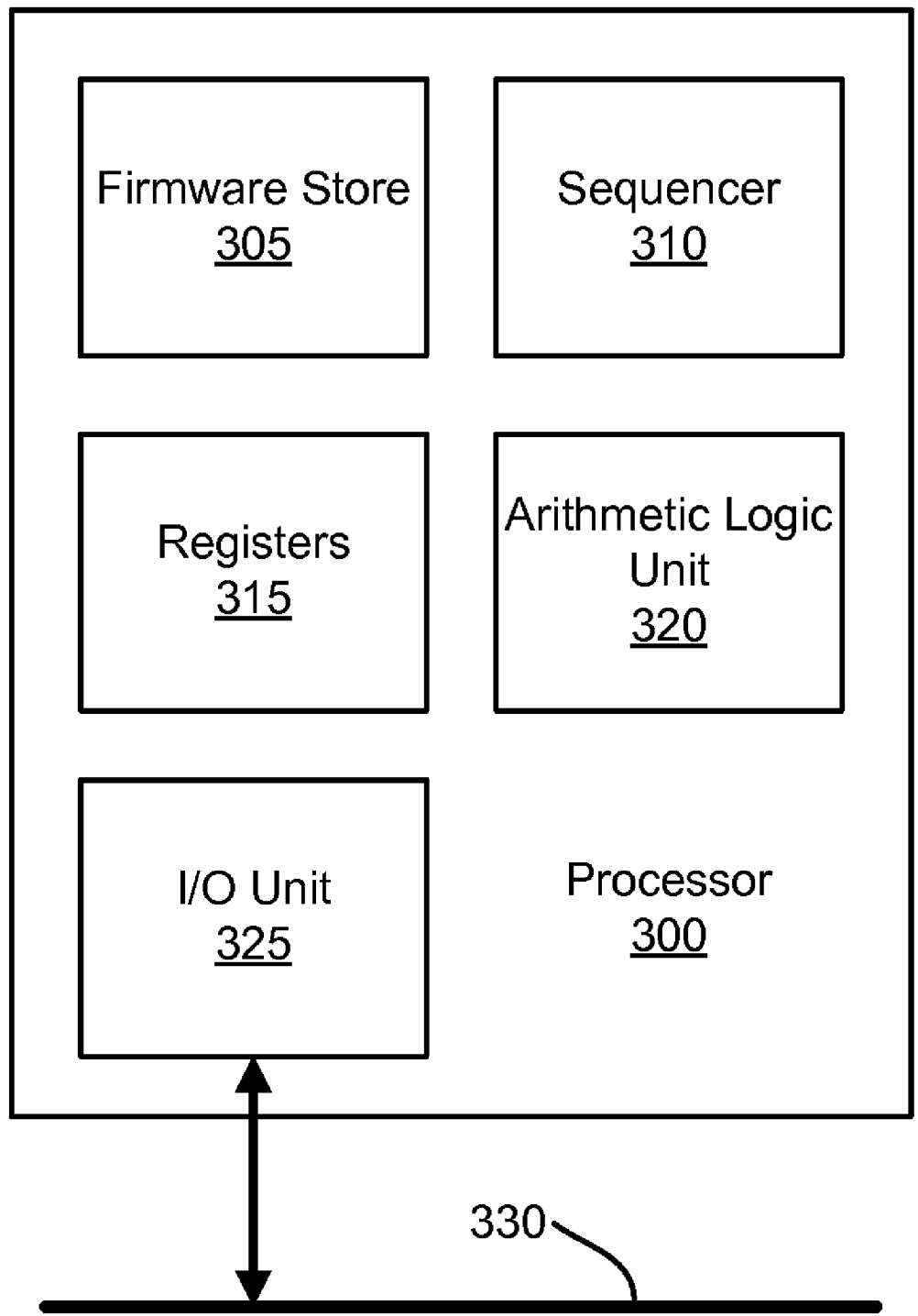
FIG. 3 is a schematic block diagram illustrating one embodiment of a processor of the present invention.

FIG. 3 is a schematic block diagram illustrating one embodiment of a processor 300 of the present invention. The processor 300 includes a firmware store 305, a sequencer 310, one or more registers 315, an Arithmetic Logic Unit (ALU) 320, an I/O unit 325, and a bus 330.

The firmware store 305 may be a semiconductor memory such as electrically programmable random access memory (EPROM), programmable random access memory (PROM), and the like. The firmware store 305 may store one or more processor readable programs. Each processor readable program may comprise one or more sequencer instructions as is well known to those of skill in the art.

The sequencer 310 may retrieve and execute a processor readable program from the firmware store 305 in response to an instruction. In one embodiment, semiconductor gates may decode the instruction and assert and/or de-assert control signals that govern the function of the processor 300 in response to the processor readable program.

The registers 315 may each store one or more data words. The ALU 320 may perform one or more operations on the data words of the registers 315. The I/O unit 325 may receive data over the bus 330 from other devices such as memory and/or bridge devices and may communicate data over the bus 330.

The controllers 160 may each include one or more processors 300. A controller 160 may write data to a storage device 170 in response to a write instruction. The I/O unit 325 may read the write instruction from the bus 330. The sequencer 310 may decode the write instruction and direct the I/O unit 325 to read data from a first address and write the data to a second address.

In the past, processors 300 have executed a plurality of non-atomic instructions to perform a read-before-write operation. As a result, multiple instructions were required and programming errors could omit an instruction. The present invention provides an atomic read-before-write instruction as will be described hereafter.

Figure 4:
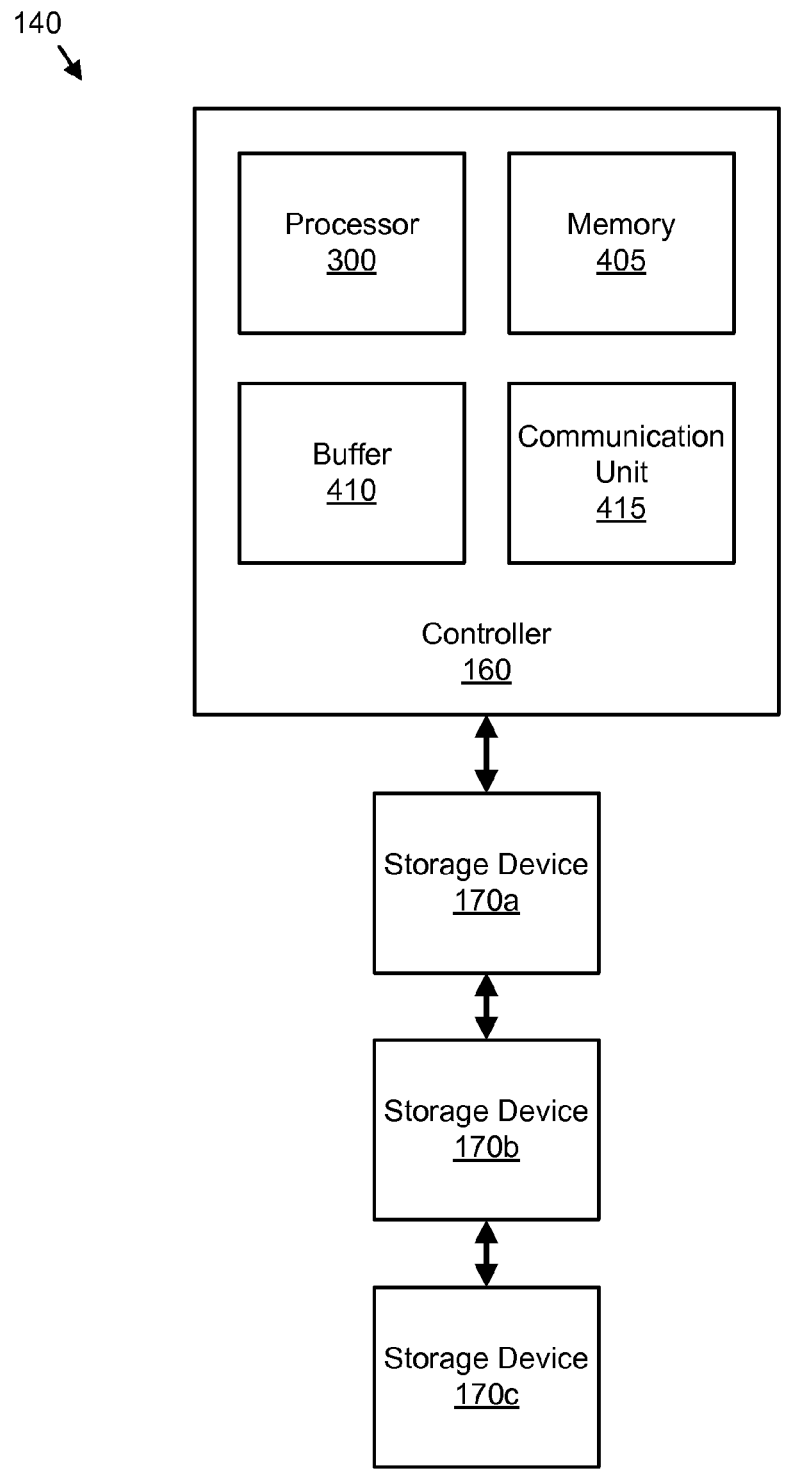
FIG. 4 is a schematic block diagram illustrating one embodiment of a storage subsystem of the present invention.

FIG. 4 is a schematic block diagram illustrating one embodiment of a storage subsystem 140 of the present invention. The description of the subsystem 140 refers to elements of FIGS. 1-3, like numbers referring to like elements. The subsystem 140 includes the controller 160 and three storage devices 170, although any number of controllers 160 and storage devices 170 may be employed.

The controller 160 includes the processor 300, memory 405, a buffer 410, and a communication unit 415. The memory 405, buffer 410, and communication unit 415 may be in communication with the bus 330 of the processor 300. The controller 160 may receive data through the communication unit 415 and store the data to the buffer 410. The processor 300 may execute instructions stored in the memory 405.

The storage devices 170 are shown communicating with the controller 160 as a loop. The controller 160 may write data from the buffer 410 to one or more storage devices 170. For example, the controller may communicate an address for the target volume 210 to the bus 330. A storage device 170 comprising the target volume 210 may receive and latch the address. The controller 160 may further communicate the data to the bus 330. The storage device 170 may write the data to the address.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
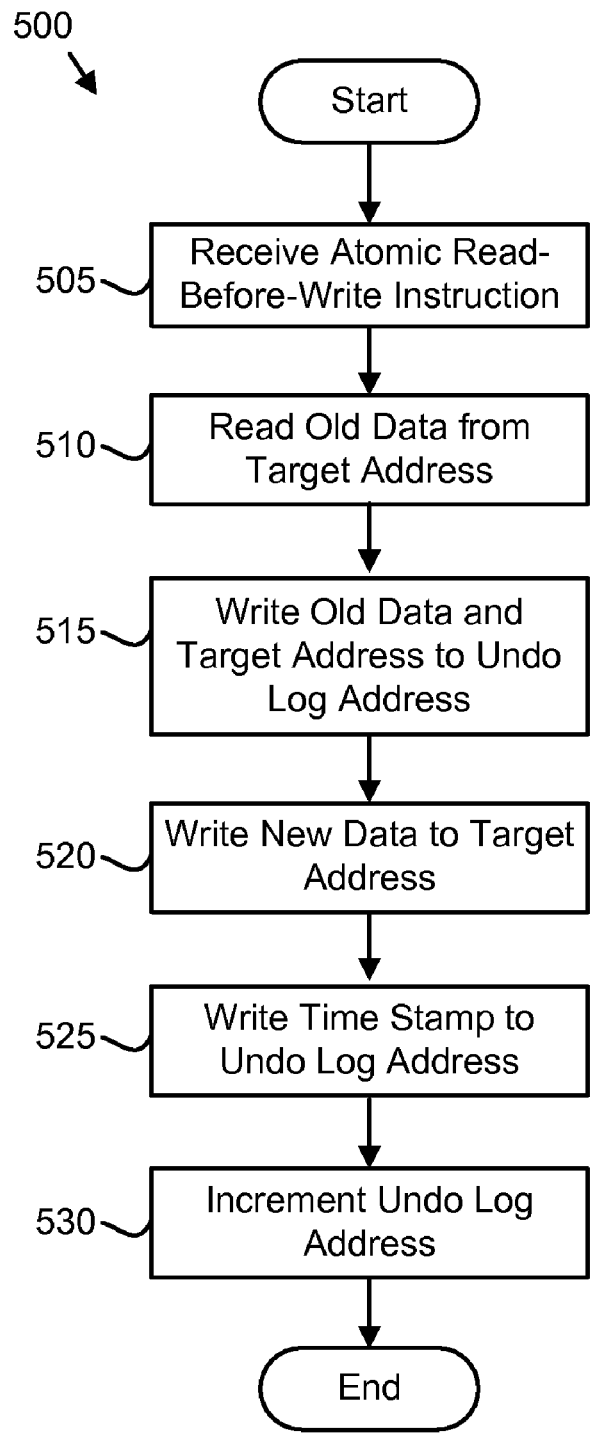
FIG. 5 is a schematic flow chart diagram illustrating one embodiment of an atomic read-before-write instruction method of the present invention.

FIG. 5 is a schematic flow chart diagram illustrating one embodiment of an atomic read-before-write instruction method 500 of the present invention. The description of the method 500 refers to elements of FIGS. 1-4, like numbers referring to like elements. The method 500 substantially includes the steps to carry out the functions presented above with respect to the operation of the described apparatus and system of FIGS. 1-4. In one embodiment, the method 500 is implemented with a processor program product comprising a processor readable medium having a processor readable program. The processor readable medium may be the firmware store 305. The processor readable program may be integrated into the processor 300, wherein the program in combination with the processor 300 is capable of performing the method 500.

The method 500 begins and the sequencer 310 receives 505 an atomic read-before-write instruction comprising new data, a target address for the new data, and an undo log address. The atomic instruction may include one or more data words. In addition, the length of the atomic instruction may vary depending on data and addresses that are appended to the instruction.

In one embodiment, the new data is stored in a register 315 referenced by the atomic read-before-write instruction. Alternatively, the new data may initially reside on the source volume 205, and the atomic read-before-write instruction may include a source address for the data on the source volume 205. The atomic read-before-write instruction is configured to perform a complete read-before-write operation so that the sequencer 310 must perform all elements of the read-before-write.

The I/O unit 325 reads 510 old data from the target address as directed by the sequencer 310. The target address may refer to storage space within the target volume 210. In one embodiment, the target address includes an offset that specifies a number of data blocks following the target address that should be written to.

In one embodiment, the sequencer 310 directs the I/O unit 325 to communicate a read command and the target address through the bus 330 and communication unit 415 to the storage device 170 of the target volume 210. The target volume 210 may communicate the old data to the controller 160 in response to the read command. The sequencer 310 may further direct the I/O unit 325 to configure communication unit 415 to direct the old data received by the communication unit 415 to addresses in the buffer 410. Alternatively, the sequencer 310 may direct the I/O unit 325 to receive the old data from the communication unit 415 through the bus 330 and store the old data in the memory 405.

The I/O unit 325 further writes 515 the old data and the target address to the undo log address. The undo log address may point to a free data space in the undo log 215. Alternatively, one or more registers 315 stores the undo log address. The sequencer 310 may direct the I/O unit 325 to communicate a write command, the undo log address, the old data, and the target address to the undo log 215. The undo log 215 may store the old data and the target address at the undo log address.

The I/O unit 325 further writes 520 the new data to the target address as directed by the sequencer 310. In one embodiment, the I/O unit 325 communicates a write command, the target address, and the new data through the bus 330 and the communication unit 415 to the target volume 210. The target volume 210 may store the new data at the target address.

In one embodiment, the I/O unit also 325 writes 525 a time stamp to the undo log address. The time stamp may comprise one or more data words that encode a year, month, day, hour, minutes, and seconds. In a certain embodiment, the time stamp encodes the time that the new data is written to the target address. The sequencer 310 may direct the I/O unit 325 to read a timer integrated in the processor 300. In addition, the sequencer may direct the ALU 320 to format a timer value into the time stamp. The sequencer 310 may then direct the I/O unit 325 to write 525 the time stamp to the undo log address.

In one embodiment, the sequencer 310 increments 530 the undo log address, and the method 500 ends. The sequencer 310 may direct the I/O unit 325 to read the undo log address into the ALU 320. The sequencer 310 may further direct the ALU 320 to add a specified value such as sixty-four (64) to the undo log address so that the undo log address again points to a free data space that may be written to. The specified value may be equivalent to a number of bytes comprising the old data, the target address, and the time stamp.

The steps of the method 500 are in response to a receiving 505 the single atomic read-before-write instruction. Thus the read-before-write operation can be reliably implemented without a programming or other errors omitting some elements of a read-before-write operation and at much better performance than an alternative application implementation, operating system implementation, or the like. In one embodiment, the processor 300 may be configured to only perform a read-before-write type of write operation so that old data may always be reliably recovered from the undo log 215.

Figure 6:
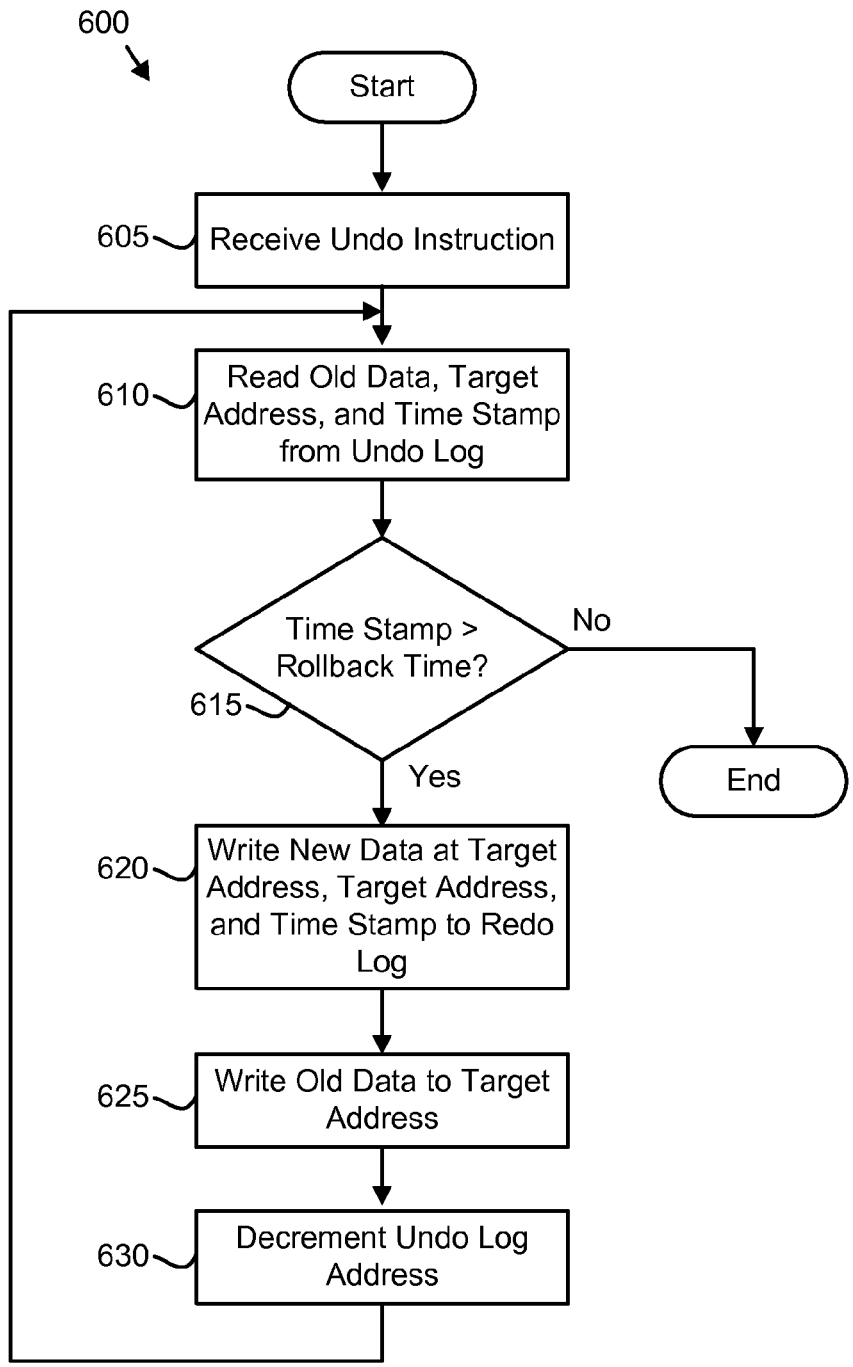
FIG. 6 is a schematic flow chart diagram illustrating one embodiment of an undo method of the present invention.

FIG. 6 is a schematic flow chart diagram illustrating one embodiment of an undo method 600 of the present invention. The description of the method 600 refers to elements of FIGS. 1-5, like numbers referring to like elements. The method 600 substantially includes the steps to carry out the functions presented above with respect to the operation of the described apparatus and system of FIGS. 1-4. In one embodiment, the method 600 is implemented with a processor program product comprising a processor readable medium having a processor readable program. The processor readable medium may be the firmware store 305. The processor readable program may be integrated into the processor 300, wherein the program in combination with the processor 300 is capable of performing the method 600.

The method 600 begins and in one embodiment, the sequencer 310 receives 605 an atomic undo instruction. The atomic undo instruction may comprise one or more data words. In addition, the length of the atomic instruction may vary depending on data and addresses that are appended to the instruction.

In one embodiment, the atomic undo instruction includes a rollback time. The rollback time may specify a time to which all writes to the target volume 210 will be undone. An administrator may specify the rollback time, and the rollback time may be incorporated into the atomic undo instruction as is well known to those of skill in the art.

In one embodiment, the sequencer 310 directs the I/O unit 325 to read 610 the old data, the target address, and the time stamp from the undo log 215. The I/O unit 325 may communicate the time stamp to the ALU 320.

In one embodiment, the sequencer 310 directs the ALU 320 to determine 615 if the time stamp is greater than the rollback time. For example, the time stamp may be encoded as 20070714142345 to indicate that the original read-before-write to the target volume 210 occurred on Jul. 14, 2007 at 2:23:45 p.m. Similarly, the rollback time may be encoded as 20070714141500 to indicate undoing all writes after Jul. 14, 2007 at 2:15:00 p.m. The ALU 320 may determine that the time stamp is greater than the rollback time.

If the time stamp is not greater than the rollback time, the method 600 may end. If the time stamp is greater than the rollback time, the sequencer 310 may direct the I/O unit 325 to write 620 the new data, the target address, and the time stamp to the redo log 220. In one embodiment, the sequencer 310 directs the I/O unit 325 to write 625 the old data to the target address of the target volume 210. The old data is thus restored to the target volume 210.

In a certain embodiment, the sequencer 310 directs the I/O unit 325 to decrement the undo log address. The sequencer 310 may direct the I/O unit 325 to read the undo log address into the ALU 320. The sequencer 310 may further direct the ALU 320 to subtract a specified value such as sixty-four (64) from the undo log free data space address s that future writes to the undo log will overwrite the old data while a subsequent undo reads 610 old data that is not rolled back.

In one embodiment, the sequencer 310 directs the I/O unit 325 to read 610 additional old data and the target addresses from the undo log 215 until the time stamp is not greater than the rollback time and the method 600 ends. The undo method 600 utilizes the old data and target address written to the undo log 215 by the atomic read-before-write instruction to restore the old data to the target volume 210. Thus overwritten data may be recovered.

Figure 7:
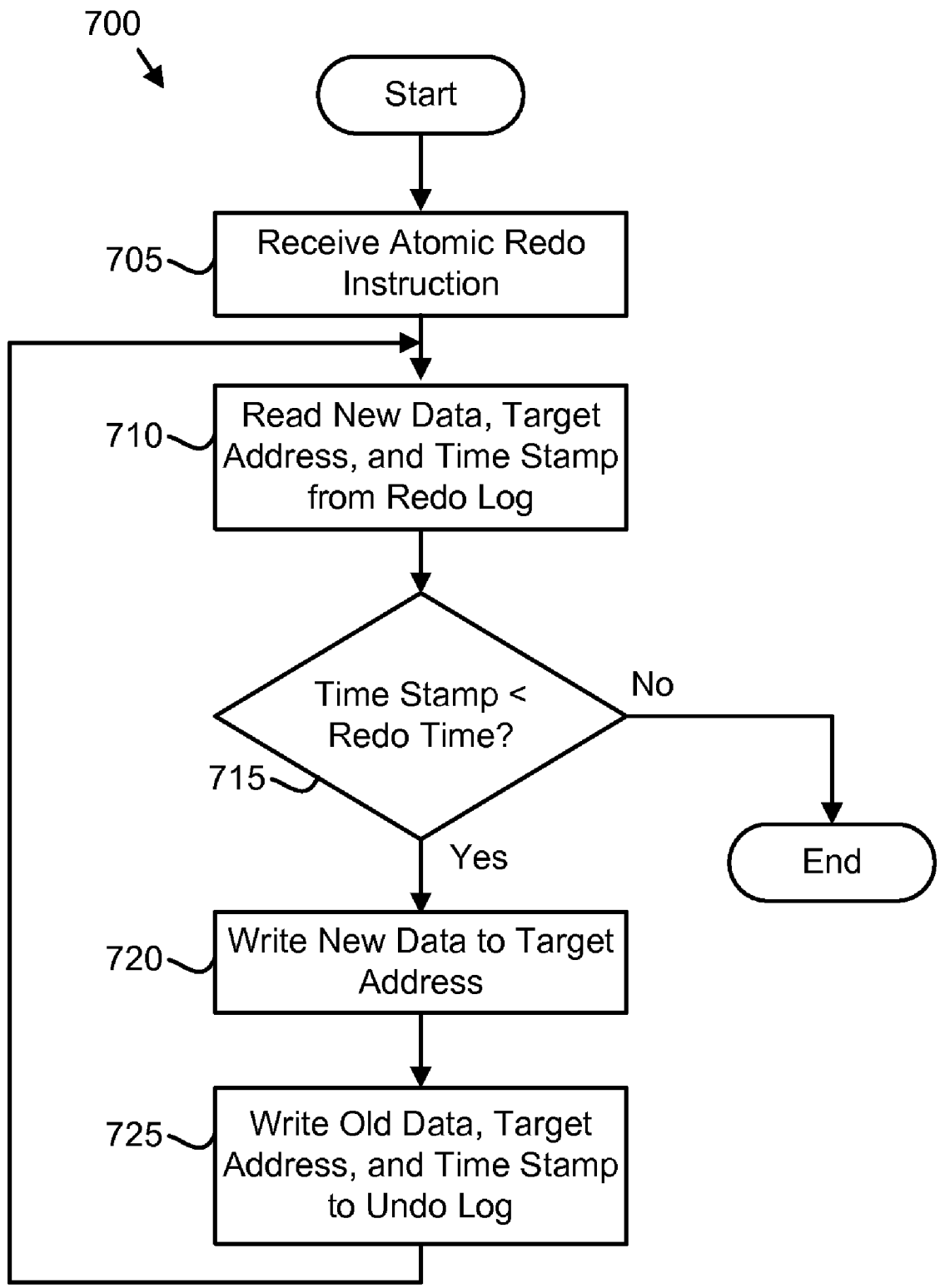
FIG. 7 is a schematic flow chart diagram illustrating one embodiment of a redo method of the present invention.

FIG. 7 is a schematic flow chart diagram illustrating one embodiment of a redo method 700 of the present invention. The description of the method 700 refers to elements of FIGS. 1-6, like numbers referring to like elements. The method 700 substantially includes the steps to carry out the functions presented above with respect to the operation of the described apparatus and system of FIGS. 1-4. In one embodiment, the method 700 is implemented with a processor program product comprising a processor readable medium having a processor readable program. The processor readable medium may be the firmware store 305. The processor readable program may be integrated into the processor 300, wherein the program in combination with the processor 300 is capable of performing the method 700.

The method 700 begins and in one embodiment, the sequencer 310 receives 705 an atomic redo instruction. The atomic redo instruction may include one or more data words. In addition, the length of the atomic redo instruction may vary depending on data and addresses that are appended to the instruction.

In one embodiment, the atomic redo instruction includes a redo time. The redo time may specify a time to which all writes to the target volume 210 will be reapplied. An administrator may specify the redo time, and the redo time may be incorporated into the atomic redo instruction as is well known to those of skill in the art.

The sequencer 310 may direct the I/O unit 325 to read 710 the new data, the target address, and the time stamp from the redo log 220. In addition, the sequencer 310 may direct the ALU 320 to determine 715 if the time stamp is less than the redo time. The ALU 320 may subtract the time stamp from the redo time to determine 715 if the time stamp is less than the redo time.

If the time stamp is not less than the redo time, the method 700 may end, indicating that all writes applied before the redo time have been reapplied to the target volume 210. If the time stamp is less than the redo time, the sequencer 310 may direct the I/O unit 325 to write 720 the new data to the target address on the target volume 210. In addition, the sequencer 310 may direct the I/O unit 325 to write 725 the old data, the target address, and the time stamp to the undo log address of the undo log 215 as described in steps 515 and 525 of FIG. 5.

In one embodiment, the sequencer 310 directs the I/O unit 325 to read 710 additional new data, the target addresses, and the time stamps from the redo log 220 until the time stamp is not less than the redo time and the method 700 ends. The method 700 reapplies writes that have been undone.

Figure 8A:
FIG. 8A is a schematic block diagram illustrating one embodiment of an atomic read-before-write instruction of the present invention.

FIG. 8A is a schematic block diagram illustrating one embodiment of an atomic read-before-write instruction 800a of the present invention. The description of the instruction 800a refers to elements of FIGS. 1-7, like numbers referring to like elements.

The instruction 800a includes a read-before-write command 805, a new data address 810, a target address 815, and an undo log address 820. The sequencer 310 decodes the read-before-write command 805 and executes the read-before-write such as is described by the method 500 of FIG. 5. The new data address 810 describes the source of the new data. For example, the new data address 810 may point to the new data stored in the source volume 205, the memory 405, the buffer 410, or the like.

The target address 815 specifies where the new data should be written. In a certain embodiment, the target address 815 comprises a Logical Unit Number (LUN) address, a Logical Block Address (LBA), and a number of blocks. The undo log address 820 specifies where the old data originally stored at the target address 815 should be written in the undo log 215. The atomic read-before-write instruction 800a provides sufficient information for the sequencer 310 to perform a read-before-write without decoding additional instructions.

Figure 8B:
FIG. 8B is a schematic block diagram illustrating one alternate embodiment of an atomic read-before-write instruction of the present invention.

FIG. 8B is a schematic block diagram illustrating one alternate embodiment of an atomic read-before-write instruction 800b of the present invention. The description of the instruction 800b refers to elements of FIGS. 1-7, like numbers referring to like elements.

The instruction 800b includes the read-before-write command 805 and the target address 815 of FIG. 8A. The instruction 800b further includes the new data 825 that should be written to the target address 815.

In one embodiment, the atomic read-before-write instruction 800b includes a flag 830. The processor 300 may store the undo log address 820 in a register 315 and/or in a memory location of the memory 405 referenced by a register 315. If the flag 830 is set to a specified value, the sequencer 310 may increment the undo log address 820. For example, the sequencer 310 may direct the ALU 320 to add a specified value such as eight (8) to the undo log address 820.

Figure 8C:
FIG. 8C is a schematic block diagram illustrating one additional embodiment of an atomic read-before-write instruction of the present invention.

FIG. 8C is a schematic block diagram illustrating one additional embodiment of an atomic undo instruction 800c of the present invention. The description of the instruction 800c refers to elements of FIGS. 1-7, like numbers referring to like elements.

The instruction 800c includes the read-before-write command 805, the target address 815, and the new data 825 of FIG. 8B. The instruction 800c further includes an undo log index 835. The undo log index 835 directs the sequencer 310 to retrieve the undo log address 820 from the register 315 referenced by the undo log index 835.

Figure 8D:
FIG. 8D is a schematic block diagram illustrating one embodiment of an atomic undo instruction of the present invention.

FIG. 8D is a schematic block diagram illustrating one embodiment of an atomic undo instruction 840 of the present invention. The description of the instruction 840 refers to elements of FIGS. 1-7, like numbers referring to like elements.

The instruction 840 includes an undo command 845 and a rollback time 850. The sequencer 310 decodes the undo command 845 and executes the undo such as is described by the method 600 of FIG. 6. The rollback time 850 may specify a point in time when writes to the target volume 210 should no longer be rolled back.

Figure 8E:
FIG. 8E is a schematic block diagram illustrating one embodiment of an atomic redo instruction of the present invention.

FIG. 8E is a schematic block diagram illustrating one embodiment of an atomic redo instruction 860 of the present invention. The description of the instruction 860 refers to elements of FIGS. 1-7, like numbers referring to like elements.

The instruction 860 includes a redo command 865 and a redo time 870. The sequencer 310 decodes the redo command 865 and executes a redo such as is described by the method 700 of FIG. 7. The redo time 870 may specify a point in time to which to restore writes to the target volume 210.

Figure 9:
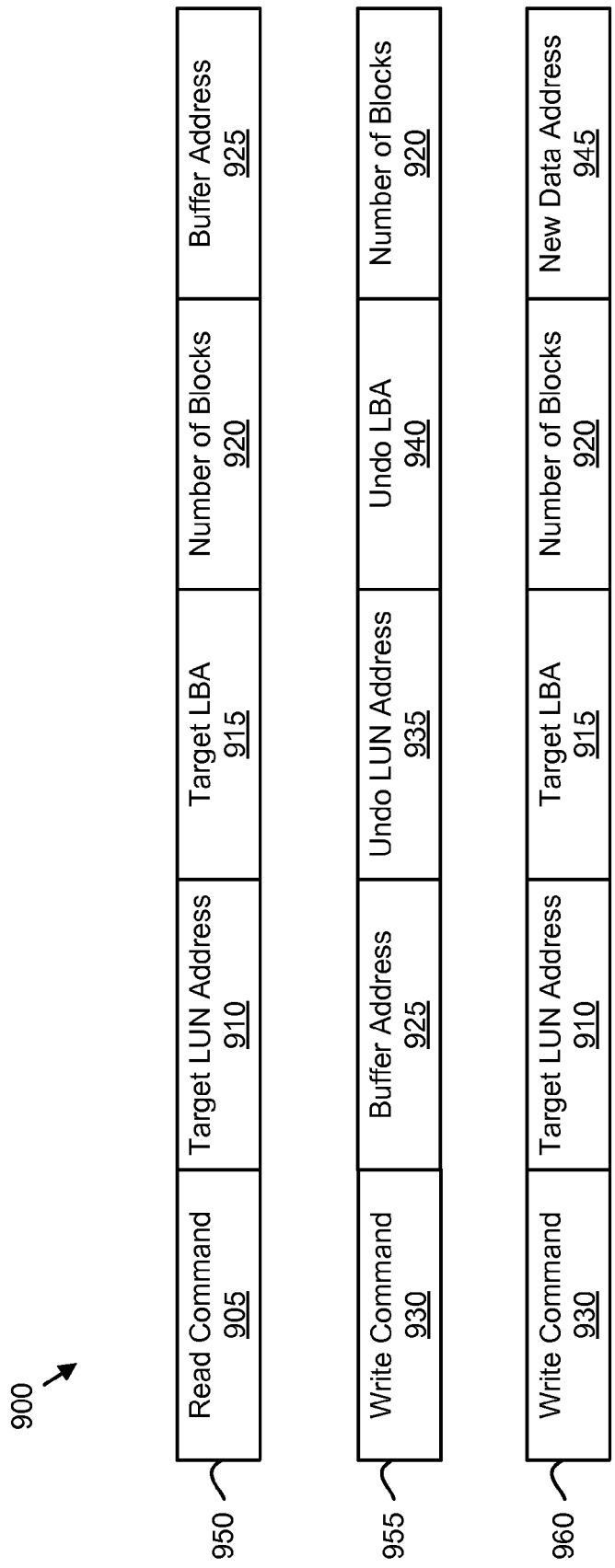
FIG. 9 is a schematic block diagram illustrating one embodiment of reads and writes of the present invention.

FIG. 9 is a schematic block diagram illustrating one embodiment of reads and writes 900 of the present invention. The reads and writes 900 may be issued by the processor 300 as directed by the sequencer 310 in response to receiving the atomic read-before-write instruction 800a.

In one embodiment, the sequencer 310 directs the I/O unit 325 to communicate a read 950 comprising a read command 905, a target LUN address 910, a target LBA 915, a number of blocks 920, and a buffer address 925. The I/O unit 325 may communicate the read 950 through the bus 330 and the communication unit 415 to the target volume 210 specified by the target LUN address 910. In response, the target volume 210 may write the data stored at the target LBA 915 and a number of contiguous blocks specified by the number of blocks 920 to the buffer 410 beginning at the buffer address 925.

The sequencer 310 may further direct the I/O unit 325 to communicate an undo log write 955 comprising a write command 930, the buffer address 925, an undo LUN address 935, an undo LBA 940, and the number of blocks 920. The controller 160 may communicate the write command 930 and blocks specified by the number of blocks 920 from the buffer 410 beginning at the buffer address 925 to the undo log address 820 specified by the undo LUN address 935 and the undo LBA 940 to the undo log 215. The undo log 215 may store the blocks at the undo LBA 940.

In one embodiment, the sequencer 310 directs the I/O unit 325 to communicate a target write 960 comprising the write command 930, the target LUN address 910, the target LBA 915, the number of blocks 920, and a new data address 945. In response, the controller 160 may communicate blocks of the new data specified by the number of blocks 920 from a source volume 205 specified by the new data address 945 to the target address specified by the target LUN address 910.

Thus sequencer 310 performs a read-before-write operation in response to a single atomic read-before-write instruction 800. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A firmware program product comprising a tangible storage medium having a processor readable program, wherein the processor readable program when executed by a processor causes the processor to:

receive an atomic read-before-write instruction comprising new data, a target address for the new data, and an undo log address;

read old data from the target address from a first storage device of a plurality of separate storage devices in communication over a storage communications channel with a controller comprising the processor;

write the old data and the target address to a buffer of the controller;

write the old data and the target address to the undo log address in a second storage device;

write the new data to the target address in the first storage device;

increment the undo log address with a value equivalent to a number of bytes comprising the old data, the target address, and a time stamp;

receive an atomic undo instruction;

read the old data and the target address from the undo log on the second storage device in response to the atomic undo instruction; and write the old data to the target address on the first storage device in response to the atomic undo instruction.

2. The firmware program product of claim 1, wherein the processor readable program is further configured to cause the processor to write the old data and the target address to the undo log address in response to a flag in the atomic read-before-write instruction.

3. The firmware program product of claim 1, wherein the processor readable program is further configured to cause the processor to decrement the undo log address.

4. The firmware program product of claim 1, wherein the processor readable program is further configured to cause the processor to write a time stamp to the undo log.

5. The firmware program product of claim 4, wherein the processor readable program is further configured to cause the processor to:

read the time stamp from the undo log in response to the atomic undo instruction;

write the old data to the target address and decrement the undo log address if the time stamp is greater than a rollback time.

6. The firmware program product of claim 5, wherein the processor readable program is further configured to cause the processor to write the new data, the target address, and the time stamp to a redo log in response to the atomic undo instruction.

7. The firmware program product of claim 6, wherein the processor readable program is further configured to cause the processor to:

receive an atomic redo instruction;

read the new data, the target address, and the time stamp from the redo log; and write the new data to the target address and the old data, the target address, and the time stamp to the undo log address if the time stamp is less than a redo time.

8. The firmware program product of claim 1, wherein the tangible storage medium is a programmable random access memory in a processor core of the processor and the processor core comprises a sequencer executing the processor readable program.

9. A method for a read-before-write instruction, the method integrating a processor readable program into a processor and comprising:

receiving an atomic read-before-write instruction comprising new data, a target address for the new data, and an undo log address;

reading old data from the target address from a first storage device of a plurality of separate storage devices in communication over a storage communications channel with a controller comprising the processor;

writing the old data and the target address to a buffer of the controller;

writing the old data and the target address to the undo log address in a second storage device;

writing the new data to the target address in the first storage device; and incrementing the undo log address with a value equivalent to a number of bytes comprising the old data, the target address, and a time stamp;

receiving an atomic undo instruction;

reading the old data and the target address from the undo log on the second storage device in response to the atomic undo instruction; and writing the old data to the target address on the first storage device in response to the atomic undo instruction.

10. The method of claim 9, the method further comprising writing the old data and the target address to the undo log address in response to a flag in the atomic read-before-write instruction.

11. The method of claim 9, the method further comprising decrementing the undo log address.

12. The method of claim 9, wherein a programmable random access memory in a processor core of the processor stores the processor readable program and the processor core comprises a sequencer executing the processor readable program.

13. An apparatus for a read-before-write instruction, the apparatus comprising:

a sequencer comprising hardware circuits and configured to receive an atomic read-before-write instruction comprising new data, a target address for the new data, and an undo log address;

an input/output (I/O) unit comprising hardware circuits and configured to read old data from the target address from a first storage device of a plurality of separate storage devices in communication over a storage communications channel with a controller comprising the sequencer, write the old data and the target address to a buffer of the controller, write the old data and the target address to the undo log address in a second storage device, and write the new data to the target address in the first storage device as directed by the sequencer; and the sequencer further configured to increment the undo log address with a value equivalent to a number of bytes comprising the old data, the target address, and a time stamp and receive an atomic undo instruction;

the I/O unit further configured to read the old data and the target address from the undo log on the second storage device and write the old data to the target address on the first storage device in response to the atomic undo instruction.

14. The apparatus of claim 13, wherein sequencer directs the I/O unit to write the old data and the target address to the undo log address in response to a flag in the atomic read-before-write instruction.

15. The apparatus of claim 13, wherein the sequencer and I/O unit are further configured to write a time stamp to the undo log.

16. The apparatus of claim 15, wherein the I/O unit is further configured to read the time stamp from the undo log and write the old data to the target address and decrement the undo log address if the time stamp is greater than a rollback time as directed by the sequencer.

17. The apparatus of claim 16, wherein the I/O unit is further configured write the new data, the target address, and the time stamp to a redo log as directed by the sequencer.

18. The apparatus of claim 17, wherein the sequencer is further configured to receive an atomic redo instruction and direct the I/O unit to read the new data, the target address, and the time stamp from the redo log and write the new data to the target address and the old data, the target address, and the time stamp to the undo log address if the time stamp is less than a redo time.

19. The apparatus of claim 13, wherein the atomic read-before-write instruction and the atomic undo instruction are stored in a programmable random access memory in a processor core comprising the sequencer.

20. A method for deploying computer infrastructure, comprising integrating a processor readable program into a processor, wherein the program in combination with the processor is capable of performing the following:
  receiving an atomic read-before-write instruction comprising new data, a target address for the new data, and an undo log address;
  reading old data from the target address from a first storage device of a plurality of separate storage devices in communication over a storage communications channel with a controller comprising the processor;
  writing the old data and the target address to a buffer of the controller;
  writing the old data and the target address to the undo log address in a second storage device;
  writing the new data to the target address in the first storage device;
  writing a time stamp to the undo log address;
  incrementing the undo log address with a value equivalent to a number of bytes comprising the old data, the target address, and the time stamp;
  receiving an atomic undo instruction;
  reading the old data and target address from the undo log on the second storage device in response to the atomic undo instruction; and
  writing the old data to the target address on the first storage device in response to the atomic undo instruction.

21. The method of claim 20, further comprising:
  reading the time stamp from the undo log; and
  writing the old data to the target address and decrementing the undo log address if the time stamp is greater than a rollback time.

22. The method of claim 20, wherein a programmable random access memory in a processor core of the processor stores the processor readable program and the processor core comprises a sequencer executing the processor readable program.

23. A system to issue a read-before-write instruction, the system comprising:
  a target volume comprising addressable memory;
  an undo log comprising addressable memory;
  a redo log comprising addressable memory;
  a processor configured to
  receive an atomic read-before-write instruction comprising new data, a target address on the target volume for the new data, and an undo log address in the undo log;
  read old data from the target address from a first storage device of a plurality of separate storage devices in communication over a storage communications channel with a controller comprising the processor;
  write the old data and the target address to a buffer of the controller;
  write the old data and the target address to the undo log address in a second storage device;
  write the new data to the target address in the first storage device;
  increment the undo log address with a value equivalent to a number of bytes comprising the old data, the target address, and a time stamp;
  receive an atomic undo instruction;
  read the old data and target address from the undo log on the second storage device in response to the atomic undo instruction; and
  write the old data at the target address on the first storage device in response to the atomic undo instruction.

24. The system of claim 23, wherein the atomic read-before-write instruction and the atomic undo instruction are stored in a programmable random access memory in a processor core of the processor, the processor core comprising the sequencer.

\* \* \* \* \*